United States Patent
Raghavan et al.

(10) Patent No.: US 10,909,321 B2
(45) Date of Patent: Feb. 2, 2021

(54) AUTOMATED TRAVEL DIARY GENERATION

(71) Applicant: Microsoft Technology Licensing, LLC, Redmond, WA (US)

(72) Inventors: Ananthatejas Raghavan, Hyderabad (IN); Sravanth Venkata Madhu Kurumaddali, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 575 days.

(21) Appl. No.: 15/811,967

(22) Filed: Nov. 14, 2017

(65) Prior Publication Data

US 2019/0147042 A1 May 16, 2019

(51) Int. Cl.
| | |
|---|---|
| *G06F 40/30* | (2020.01) |
| *G06N 3/00* | (2006.01) |
| *G06N 20/00* | (2019.01) |
| *G06F 16/951* | (2019.01) |
| *G06F 16/901* | (2019.01) |
| *G06Q 50/14* | (2012.01) |
| *G06F 40/56* | (2020.01) |
| *G06F 40/166* | (2020.01) |
| *G06F 40/295* | (2020.01) |

(52) U.S. Cl.
CPC .......... *G06F 40/30* (2020.01); *G06F 16/9024* (2019.01); *G06F 16/951* (2019.01); *G06F 40/166* (2020.01); *G06F 40/295* (2020.01); *G06F 40/56* (2020.01); *G06N 3/006* (2013.01); *G06N 20/00* (2019.01); *G06Q 50/14* (2013.01)

(58) Field of Classification Search
CPC . H04L 9/32; G06F 3/048; G06F 17/30; G09B 3/00; G06Q 10/02
See application file for complete search history.

(56) References Cited

U.S. PATENT DOCUMENTS

| | | | | |
|---|---|---|---|---|
| 7,580,551 | B1 * | 8/2009 | Srihari | G06K 9/00161 340/5.52 |
| 8,805,348 | B2 * | 8/2014 | Matsuoka | H04M 1/72566 455/418 |
| 2003/0031995 | A1 * | 2/2003 | Laura | G09B 5/062 434/317 |
| 2007/0073562 | A1 * | 3/2007 | Brice | G06Q 10/02 705/5 |
| 2007/0166684 | A1 * | 7/2007 | Walker | G09B 7/02 434/322 |
| 2009/0143977 | A1 * | 6/2009 | Beletski | G01C 21/343 701/533 |
| 2009/0313679 | A1 | 12/2009 | McAfee | |

(Continued)

*Primary Examiner* — Oluseye Iwarere

(57) ABSTRACT

Automated travel diary creation is provided. Various implicit and explicit signals are collected and shared with a trip content generation system, which operates to identify visits made by a user and details about trip associated visits, to generate sentences describing the visits based on a learned personal writing style of the user, and to order the generated sentences and form coherent paragraphs in combination with related images to generate an automatically curated, enriched, and personalized travel diary. The travel diary is displayed to the user in a graphical user interface. The user is enabled to edit the travel diary and to share the travel diary with other users.

20 Claims, 11 Drawing Sheets

(56) References Cited

U.S. PATENT DOCUMENTS

| | | | |
|---|---|---|---|
| 2010/0179816 A1* | 7/2010 | Wu | G06Q 10/06 705/1.1 |
| 2011/0043652 A1* | 2/2011 | King | G06F 40/194 348/222.1 |
| 2013/0006952 A1* | 1/2013 | Wong | G06F 16/9535 707/706 |
| 2013/0117909 A1* | 5/2013 | Paas | G09F 21/02 2/244 |
| 2013/0191470 A1* | 7/2013 | Geraci | G06Q 10/02 709/206 |
| 2013/0215116 A1* | 8/2013 | Siddique | G06Q 20/204 345/420 |
| 2013/0268886 A1* | 10/2013 | Sureshkumar | G06Q 10/063116 715/810 |
| 2014/0052680 A1* | 2/2014 | Nitz | G06N 5/04 706/46 |
| 2014/0052681 A1* | 2/2014 | Nitz | H04L 51/02 706/46 |
| 2014/0108066 A1* | 4/2014 | Lam | G06Q 10/02 705/5 |
| 2014/0297666 A1* | 10/2014 | Morris | G06F 16/2453 707/754 |
| 2015/0046088 A1* | 2/2015 | Jang | G06Q 10/047 701/533 |
| 2015/0168162 A1* | 6/2015 | Subramanian | G01C 21/28 701/523 |
| 2015/0254349 A1* | 9/2015 | Sela | G06F 16/958 707/770 |
| 2016/0034827 A1* | 2/2016 | Morris | G06F 3/04842 705/5 |
| 2016/0125559 A1* | 5/2016 | Shekou | G01C 21/343 705/6 |
| 2016/0132488 A1* | 5/2016 | Clark | G06F 40/205 704/9 |
| 2016/0210602 A1* | 7/2016 | Siddique | G06Q 30/0605 |
| 2017/0078621 A1* | 3/2017 | Sahay | G06F 40/186 |
| 2017/0293610 A1* | 10/2017 | Tran | G06Q 10/025 |
| 2017/0344631 A1* | 11/2017 | Thirumalai-Anandanpillai | G06Q 30/02 |
| 2018/0101598 A1* | 4/2018 | Allen | G06F 40/216 |
| 2018/0181345 A1* | 6/2018 | Vangala | G06Q 10/00 |
| 2018/0295826 A1* | 10/2018 | Blackadar | A01K 97/125 |
| 2019/0147042 A1* | 5/2019 | Raghavan | G06F 40/30 706/11 |

* cited by examiner

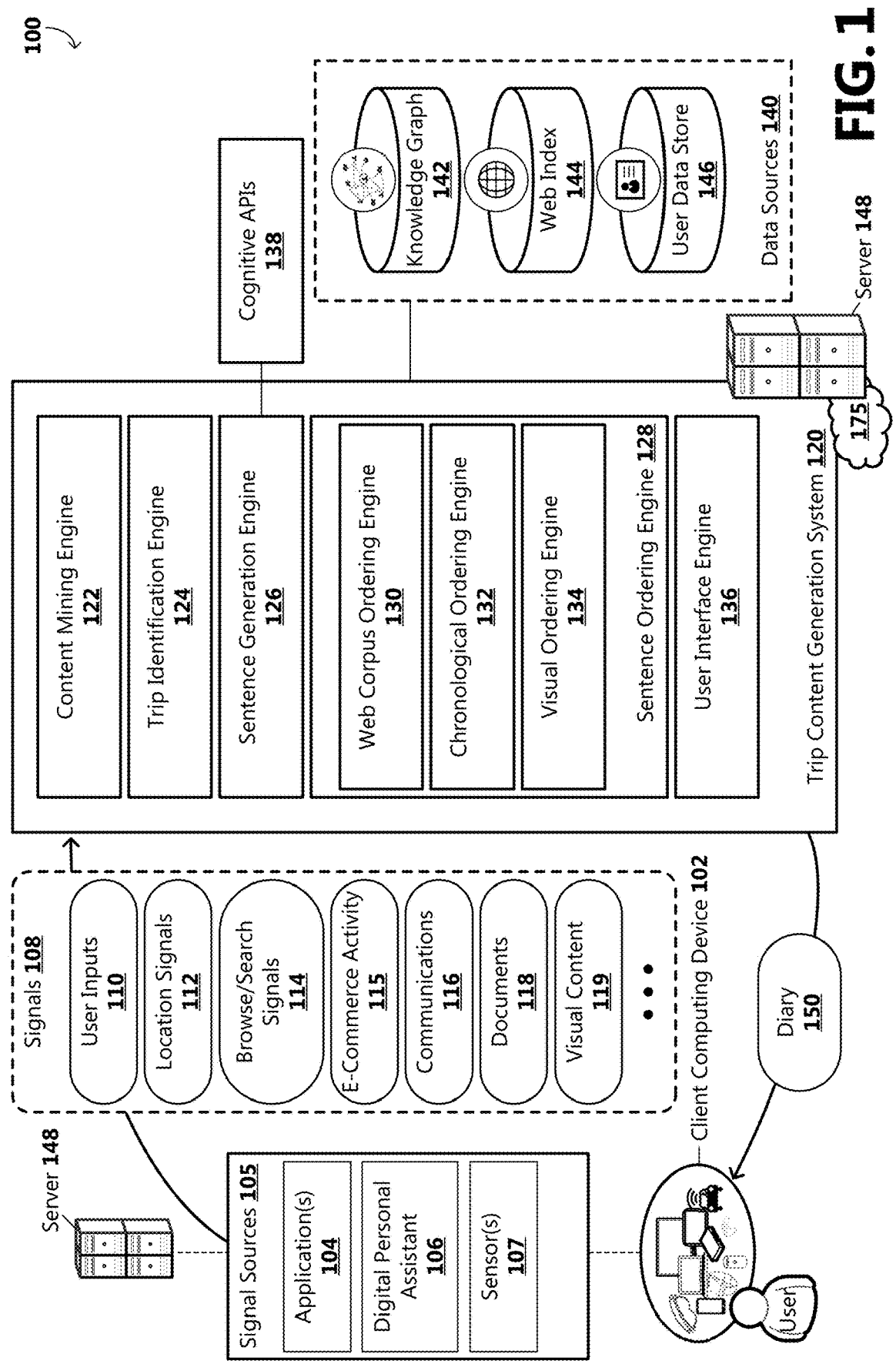

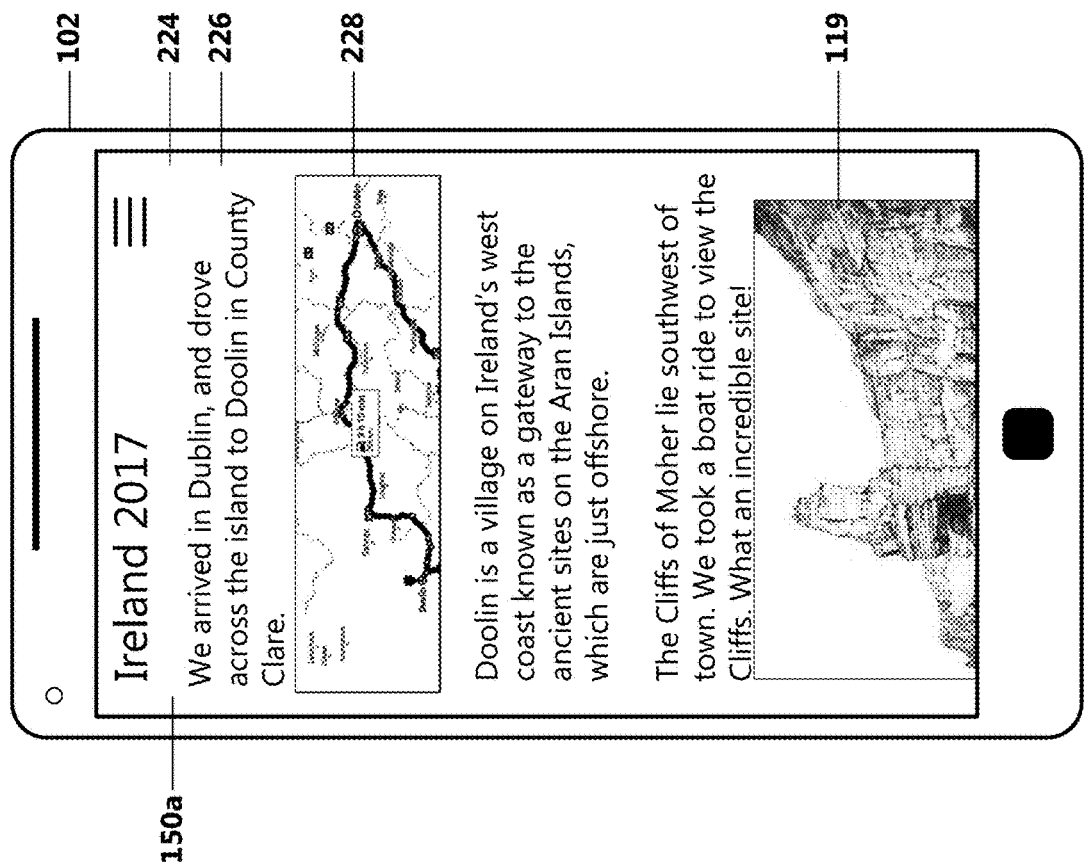

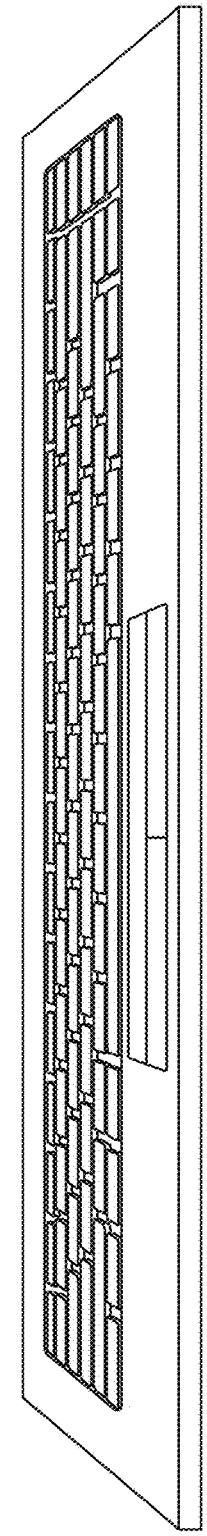

AUTOMATED TRAVEL DIARY GENERATION

BACKGROUND

Travelers typically memorialize their travel experiences through travel diaries, which involves capturing moments and data at visited locations, recalling such moments and data post-trip, and summarizing the information in an orderly fashion. A travel diary can form a memory trail for travelers and can help other travelers in planning their trips. As can be appreciated, the process of organizing and authoring a travel diary can be tedious and can require a considerable amount of research time, along with memory of the trip details and writing skills. With the advent of personal assistants and other technologies, a number of the above tasks can be automated.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Aspects are directed to a method, system, and computer readable storage device for providing automated travel diary creation. A trip content generation system is provided that is operative or configured to identify a trip made by the user, to generate sentences describing the trip based on a learned personal writing style of the user, and to order the generated sentences to form coherent paragraphs in combination with related visual content. The output is a travel diary that is not just a list of locations that the user has visited with data about them, but is a personalized narrative that summarizes the user's experience in a manner that mimics the user's writing vocabulary and sentence generation patterns and is enriched with images and various attributes of the user's experience.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings:

FIG. 1 is a block diagram illustrating an example environment in which a trip content generation system can be implemented;

FIGS. 2A-C illustrate example user interfaces generated by aspects of the trip content generation system displayed on a mobile phone;

FIGS. 3A-C illustrate example user interfaces generated by aspects of the trip content generation system displayed on a laptop device;

DETAILED DESCRIPTION

Figures 2A, 2B:
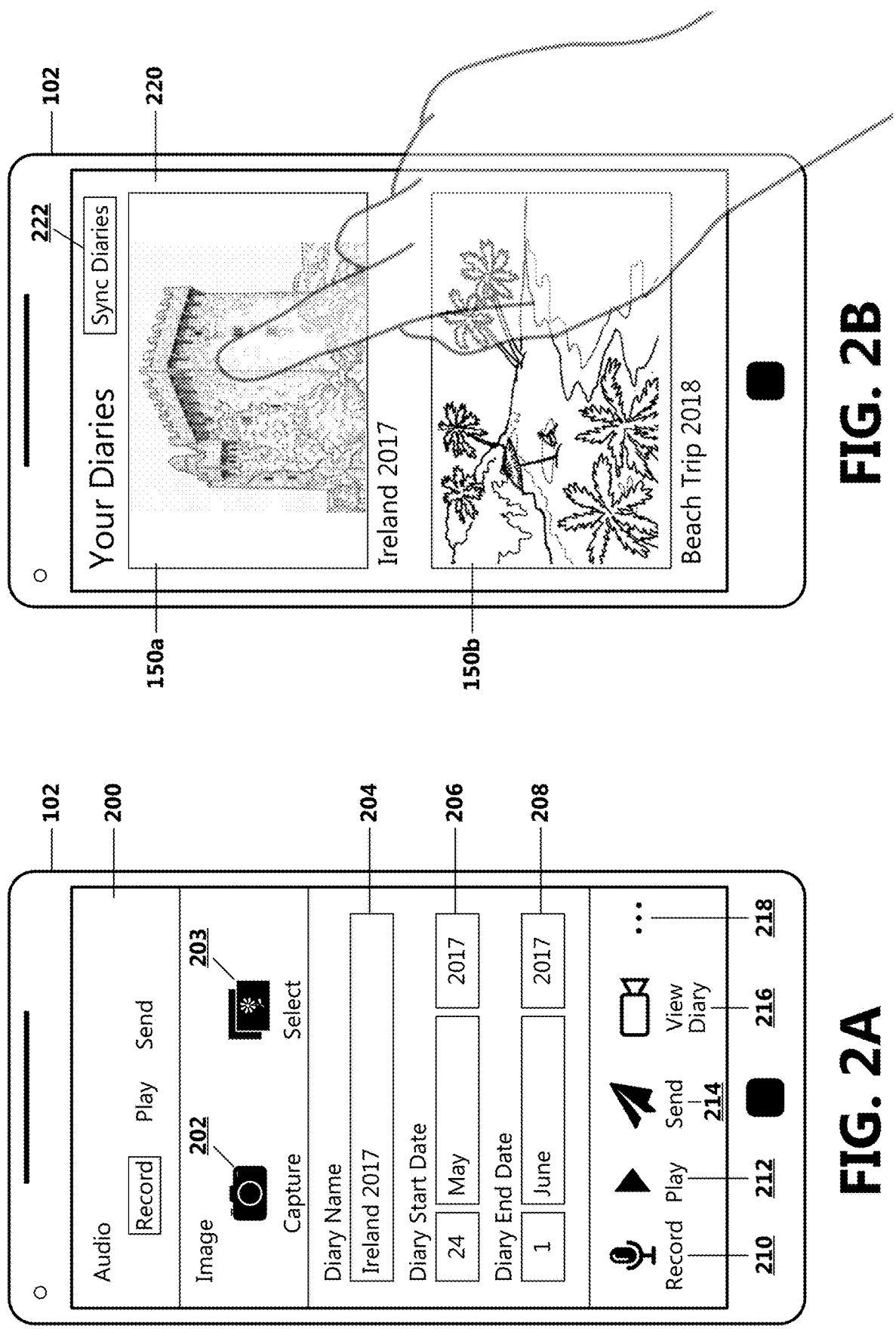

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system and computer readable storage device for providing automated travel diary creation. For example, various implicit and explicit signals are collected and shared with a trip content generation system, which operates to identify visits made by a user and details about the visits, to generate sentences describing the visits based on the user's personal writing style, and to order the generated sentences and form coherent paragraphs in combination with related visual content to generate an automatically curated, enriched, and personalized travel diary. As should be appreciated, the terms "trip" and "travel" as used herein can include such user experiences and activities as vacations, excursions, work-related events, social events, and the like.

Advantageously, the disclosed aspects enable the benefit of technical effects that include, but are not limited to, increased computing efficiency and an improved user experience. For example, by automatically creating a travel diary on behalf of the user using various signals and other collected data, the user does not have to go through the tedious process of generating the travel diary, which can involve considerable research and recollection of trip events. Further, various details can be known or automatically collected, which avoids a need for explicit user input or search queries, which conserves time, effort, and multiple computer processing cycles. Further, aspects provide a new functionality to the computing device, which improves the user experience.

FIG. 1 illustrates a block diagram of a representation of a computing environment 100 in which aspects can be implemented. As illustrated, the example environment 100 includes a trip content generation system 120, operative or configured to provide automated travel diary 150 creation. The computing environment 100 includes one or more server computing devices 148, one or more client computing devices 102, and one or more data sources 140a-n (collectively 140) communicatively connected via a network 175 or combination of networks. As will be appreciated, any number and/or type of server computing devices 148, client computing devices 102 and/or data sources 140 can be included in the computing environment 100, and those illustrated in FIG. 1 are only exemplary.

The trip content generation system 120 comprises various components for automatically generating a personalized travel diary 150. According to an aspect, the trip content generation system 120 includes a content mining engine 122 illustrative of a software module, software package, system, or device operative or configured to receive or collect signals 108 from a plurality of signal sources 105. According to an aspect, various signals 108 are collected by a variety of signal sources 105, and are communicated over a network 175 or combination of networks to the trip content generation system 120. As will be described in further detail below, the trip content generation system 120 consumes implicit and explicit signals 108 to identify visits and trips comprised of one or more visits and to generate travel diaries 150 for identified trips. As mentioned above, a trip can include vacations, as well as other user experiences and activities such as work-related events, social events, and the like. For example, work-related events can include trips made by a home inspector to clients' homes or trips made by an insurance adjuster to properties. As another example, social events can include parties or gatherings attended by the user.

The signal sources 105 can include applications 104, digital personal assistants 106, and various sensors 107 operative or configured to receive, detect, collect, or sense signals 108, such as user inputs 110 (e.g., spoken inputs, user selections, typed inputs), location signals 112 (e.g., GPS signals, wireless network signals, navigation application data), browse or search signals 114, e-commerce activity 115, communications 116 (e.g., emails, calls, texts, instant messages, transcripts, website posts, social media posts, meetings, and other user data associated with communication events), documents 118, visual content 119 (e.g., photos, images, videos, emojis, infographics, GIFs (Graphics Interchange Format), memes, screenshots, quotes, data visualizations), etc., and are further operative or configured to share received, detected, collected, or sensed signals with the trip content generation system 120.

The various signal sources 105 can operate on one or more of the user's client computing devices 102, can operate on one or more server computing devices 148, or can operate on a combination of one or more of the user's client computing devices 102 and one or more server computing devices 148. According to an aspect, the various sensors 107 can be integrated with or communicatively attached to one or more client computing devices 102 or server computing devices 148. The sensors 107 can be embodied as hardware, software, or a combination of hardware and software, and are operative or configured to sense, detect, or otherwise obtain signals 108. As can be appreciated, sensors 107 can collect a variety of data, which can be used as context data for understanding signals 108.

The one or more client computing devices 102 can include various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a speaker device, a smart home device, an internet of things device, or other type of computing device). The hardware of these computing devices is discussed in greater detail in regard to FIGS. 5, 6A, 6B, and 7. Non-limiting examples of suitable applications 104 include, but are not limited to, word processing applications, spreadsheet applications, slide presentation applications, electronic mail applications, messaging applications, calendar applications, social media applications, drawing applications, note-taking applications, web browser applications, smart home device systems, and game applications. Applications 104 can include thick client applications, which are stored locally on the computing device 102, or can include thin client applications (i.e., web applications) that reside on a remote server 148 and are accessible over a network 175. A thin client application can be hosted in a browser-controlled environment or coded in a browser-supported language and reliant on a common web browser to render the application 104 executable on the computing device 102.

In some examples, the client computing device 102 comprises a trip content generation client or mobile application that operates as a user agent executing locally on the computing device 102 and that accesses the trip content generation system 120. The user is enabled to interact with the trip content generation system 120 via the client computing device 102 to provide user input 110 and other signals 108, to view automatically created travel diaries 150, and to add feedback in association with a travel diary (e.g., provide descriptions of visited locations, experiences, visual content 119, to modify information).

Digital personal assistant functionality can be provided as or by a stand-alone application, part of an application 104, or part of an operating system of the client computing device 102. According to an aspect, the digital personal assistant 106 can employ a natural language user interface (UI) that can receive spoken utterances (e.g., voice control, commands, queries, prompts) from a user that are processed with voice or speech recognition technology. A digital personal assistant 106 can support various functions, which can include interacting with the user (e.g., through the natural language UI and graphical UIs); performing tasks (e.g., making note of appointments in the user's calendar, sending messages and emails, etc.); providing services (e.g., answering questions from the user, mapping directions to a destination, etc.); gathering information (e.g., finding information requested by the user about a book or movie, locating the nearest Italian restaurant, etc.); operating the client computing device 102 (e.g., setting preferences, adjusting screen brightness, turning wireless connections on and off); and various other functions. The functions listed above are not intended to be exhaustive and other functions may be provided by the digital personal assistant 106.

According to an aspect, the trip content generation system 120 includes a trip identification engine 124 illustrative of a software module, software package, system, or device operative or configured to consume the various received or collected implicit and explicit signals 108 to identify visits and trips comprised of one or more visits and to generate travel diaries 150 for identified trips. The disclosed computing environment 100 can optionally include a privacy component that enables the user to opt in or opt out of exposing personal information. The privacy component enables the authorized and secure handling of user information, such as the various signals 108, as well as personal information that may have been obtained, is maintained, and/or is accessible within the computing environment 100. The user can be provided with notice of the collection of portions of the personal information and the opportunity to opt-in or opt-out of the collection process. Consent can take several forms. Opt-in consent can impose on the user the requirement to take an affirmative action before the data are collected. Alternatively, opt-out consent can impose on the user the requirement to take an affirmative action to prevent the collection of data before these data are collected.

According to one aspect, the trip identification engine 124 is further operative or configured to identify types of trips (e.g., recreation, work-related, social). For example, the trip identification engine 124 can identify a trip type based on explicitly defined information or can infer a trip type based on collected or received signals 108.

According to some examples, the trip identification engine 124 uses location signals 112 (e.g., captured by a signal source 105 such as an application 104, a digital personal assistant 106, or a sensor 107) to identify visits made a user, such as visits to a particular location or a particular point of interest (POI) (e.g., an amusement park, a restaurant, an attraction). In some examples, the signal source 105 confirms and obtains user feedback (e.g., in cases of low confidence signals 108) to better understand visits.

According to other examples, the trip identification engine 124 uses the user's browsing history (i.e., browse or search signals 114) to identify locations that the user has visited, POIs searched for by the user, etc. In some examples, the trip identification engine 124 is operative or configured to identify locations, POIs, or entities using a rich document understanding pipeline of search engines (e.g., if the user books a flight for a trip on a particular website, the trip identification engine can identify the travel dates and the departure and destination locations of the trip from the website URL and page details).

According to other examples, the trip identification engine 124 runs rich content extraction models on top of the user's communications 116 to identify information such as the user's flight, hotel, car, or train bookings. The trip identification engine 124 is further operative or configured to identify a trip using identified bookings, and can intelligently stitch multiple bookings together to form a single trip (e.g., comprised of flights, hotel stays, car rentals).

According to other examples, the trip identification engine 124 processes the user's documents 118 and visual content 119, such as photos or videos created or taken during an identified trip to identify visits made during the trip. For example, the trip identification engine 124 can run geotag extraction engines and entity extraction engines to identify visit details, such as locations, POIs, and other entities.

According to other examples, the trip identification engine 124 is operative or configured to process user calendar information, social media content, notes, explicit user input 110 relating to trip details, and other signals 108 to identify a trip, visits, or other user activities and events.

According to an aspect, the trip content generation system 120 further includes a sentence generation engine 126 illustrative of a software module, software package, system, or device operative or configured to generate sentences associated with an identified trip. The sentence generation engine 126 can use data associated with received and collected signals 108 and other data provided by one or more data sources 140 to obtain information associated with locations, entities, and POIs visited by the user as they relate to the user's identified trip. For example, the sentence generation engine 126 can use user inputs 110 (e.g., text input, voice input) provided by the user to generate sentences. For example, the user can provide descriptions of visited locations, experiences, or photos 119. In some examples, the trip content generation system 120 proactively prompts the user to provide additional details of a trip, for example, to better understand missing context in cases of low confidence signals 108. The trip generation system 120 can prompt the user based on the user's current context (e.g., as detected from collected signals 108). According to an aspect, the user is enabled to provide user input 110 and feedback in an online mode or in an offline mode. If the user provides user input 110 in an offline mode (e.g., records trip details when not connected to a network 175), the user input is processed by the trip content generation system 120 when the user's client computing device 102 is online again.

As another example, the sentence generation engine 126 can use location signals 112 to generate sentences about a location, entity, or POI visited by the user. According to an aspect, the sentence generation engine 126 is operative or configured to query a knowledge graph 142 for obtaining various types of information with which to enrich generated sentences. For example, a knowledge graph represents entities and properties as nodes, and attributes and relationships between entities as edges, thus providing a structured schematic of entities and their properties and how they relate to the user or to identified locations, entities, or POIs visited by the user.

As an example, the sentence generation engine 126 can use a weather API (application programming interface) to generate sentences describing the weather at an identified location.

As another example, the sentence generation engine 126 can use an entity API and a web index 144 to create a corpus of popularly used sentences which describe the locations, entities, or POIs visited by the user. In some examples, the sentence generation engine 126 can use an entity API and a web index 144 to acquire information associated with the user's trip-related activities for generating sentences. For example, activities identified in association with a home inspector's visit to a client's home can be referenced against relevant home inspection laws and codes.

As another example, the sentence generation engine 126 can use a map API to find distances between locations or other map-related data for generating sentences describing locations, entities, or POIs visited by the user.

As another example, the sentence generation engine 126 can use user data, such as user profile data or user preferences, stored in a user data store 146 for generating sentences.

According to an aspect, the sentence generation engine 126 is operative or configured to use cognitive APIs 138 to generate sentences based on visual content 119, such as photos and videos taken by the user at the various identified locations. For example, the cognitive APIs 138 support identification and tagging of landmarks, objects, people, and other entities and the generation of descriptions of identified landmarks, objects, people, and other entities.

According to another aspect, the sentence generation engine 126 is further operative or configured to learn and mimic the user's writing style to generate or rewrite sentences based on patterns learned from a set of training documents. In one example, the sentence generation engine 126 analyzes the user's communications 116, documents 118, and other collected or received signals 108 to detect patterns associated with the writing style (e.g., user's vocabulary, sentence structure, writing skills). In some examples, the sentence generation engine 126 uses commonly used phrases and words to generate sentences, and then restructures the sentences using the detected patterns to mimic the user's vocabulary and writing style. According to an aspect, the writing style applied to sentences of a particular travel diary 150 can be based in part on an explicitly defined or implicitly identified trip type. For example, a formal writing style (e.g., use of proper grammar or industry-related terms, non-use of contractions, first person point of view, or slang terms) can be applied to sentences describing a trip identified as a work-related event, while a more casual writing style can be applied to sentences describing a trip identified as a personal vacation. Other writing style imitation methods are possible and are within the scope of the present disclosure.

The trip content generation system 120 further includes a sentence ordering engine 128 illustrative of a software module, software package, system, or device operative or configured to combine the sentences generated by the sentence generation engine 126 to form coherent paragraphs. According to an aspect, the sentence ordering engine 128 comprises a web corpus ordering engine 130 operative or configured to learn the ordering of sentences based on a web corpus (i.e., web index 144), and to order the generated sentences based on the learned ordering. The web corpus ordering engine 130 can use a variety of coherent sentence ordering techniques and methods, such as topical segmentation and chronological ordering as well as other ordering techniques.

According to another aspect, the sentence ordering engine 128 further comprises a chronological ordering engine 132 operative or configured to use timestamps associated with received and collected signals 108 to correlate the various sentences generated from user inputs 110, location signals 112, browse and search signals 114, e-commerce activity signals 115, communications 116, documents 118, visual content 119, and sentence locations. The output of the chronological ordering engine 132 is a timeline of sentences in the chronological order of the user's trip visits or activities.

According to another aspect, the sentence ordering engine 128 further comprises a visual ordering engine 134 operative or configured to place images and videos 119 using the chronological order of images and content. The visual ordering engine 134 is further operative or configured to place related images and paragraphs together using location and time.

The trip content generation system 120 further includes a user interface (UI) engine 136, illustrative of a software module, software package, system, or device operative or configured to generate a graphical representation of a travel diary 150 associated with a particular trip for display to the user, wherein the travel diary comprises a set of readable and chronologically and topically ordered paragraphs comprised of sentences personalized to the user based on the learned writing skills patterns of the user and combined with related visual content 119 and other content, such as maps, links, etc. The travel diary 150 can be stored on a server 148 and accessed via a client computing device 102, or can be downloaded and stored on a client computing device.

According to an aspect, the user is enabled to view an automatically generated travel diary 150, and to make updates or modifications as desired. Received user input 110 is received by the trip content generation system 120, and is used to improve the accuracy of identifying trips, generating sentences, or ordering sentences. The user is further enabled to share an automatically generated travel diary 150 with other users.

According to an aspect, a travel diary 150 is presented differently based on the client computing device 102 on which it is viewed. For example, if the client computing device 102 is a mobile device with limited display space and/or capabilities, the travel diary 150 can be displayed in a particular format that is optimized for small form factor devices. In some examples, a collection of the user's travel diaries 150 are displayed as a card-based interface, where each travel diary 150 is displayed on an individual card. Accordingly, the user is enabled to efficiently navigate through (e.g., via swiping or clicking though) travel diaries 150 and to view information associated with one particular travel diary at a time. As another example, if the client computing device 102 is a desktop computing device with ample display space, the travel diary 150 can be displayed in a particular format that uses the extra screen space. Examples of travel diaries 150 of various formats based on device type are illustrated in FIGS. 2A-3C and are described below.

Having described an example operating environment 100 and components of the trip content generation system 120, FIGS. 2A-3C illustrate example user interfaces generated by aspects of the trip content generation system 120. With reference now to FIG. 2A, an example GUI 200 is shown displayed on a client computing device 102 embodied as a mobile phone that includes various functionalities for enabling a user to provide user input 110 to the trip content generation system 120, as well as functionalities for enabling the user to view a travel diary 150. As should be understood, the example GUI 200 is just one example of a UI and is not limiting to the vast number of possible UIs for enabling users to provide user input 110 or to view a travel diary 150. According to one example, a user can input trip-related information to initiate creation of a new travel diary 150. According to another example, the user can edit trip-related information automatically applied to a travel diary 150 by the trip content generation system 120. According to another example, the user can add trip-related information to a travel diary 150 automatically generated by the trip content generation system 120.

One example functionality includes an image capture functionality 202 for enabling the user to selectively capture a photo or video 119 via the client computing device 102 to add to a travel diary 150 or to replace an automatically selected photo or video.

Another example functionality includes an image selection functionality 203 for enabling the user to select a previously captured photo or video 119 (stored locally on the client computing device 102 or in a communicatively attached server-based data store) to add to a travel diary 150 or to replace an automatically selected photo or video 119.

Another example functionality includes a diary title field 204 for enabling the user to add or edit a title of a travel diary 150, such as an automatically-generated title of a travel diary 150.

Another example functionality includes a trip/diary start date field 206 for enabling the user to add or edit a start date of a trip or of a travel diary 150. Another example functionality includes a trip/diary end date field 208 for enabling the user to add or edit an end date of a trip or of a travel diary 150. According to an aspect, user edits to a start or end date can be used by the trip content generation system 120 to train or tune the trip identification engine 124.

Another example functionality includes a record functionality 210 for enabling the user to provide spoken user input 110 in association with a travel diary 150 (e.g., narrative to use in generating sentences or description of a photo or video 119).

Another example functionality includes a play functionality 212 for enabling the user to selectively playback spoken user input 110.

Another example functionality includes a send functionality 214 for enabling the user to upload or send input or edited trip-related information to the trip content generation system 120.

Another example functionality includes a view diary functionality 216 for enabling the user to view a travel diary 150.

Another example functionality includes a menu functionality 218, which when selected, causes a display of a menu including various other functionalities. One example of another functionality that could be provided in the menu includes a keyboard functionality for enabling the user to provide text (or typed) user input 110 in association with a travel diary 150 (e.g., narrative to use in generating sentences or description of a photo or video 119). As should be appreciated, the example GUI 200 in FIG. 2A illustrates various functionalities for enabling input of travel-related information in association with a travel diary 150. Other functionalities and other arrangements of functionalities are possible and are within the scope of the present disclosure.

With reference now to FIG. 2B, an example GUI 220 is shown displayed on a client computing device 102 embodied as a mobile phone that includes a display of a plurality of travel diaries 150a,b (collectively 150) created by the trip content generation system 120 for a user. For example, each travel diary 150 can be represented by a trip or diary title and a photo 119 from the associated trip. Upon selection of a travel diary 150, the contents of the selected travel diary 150 are displayed to the user. According to an aspect, a sync diaries functionality 222 is provided for enabling a user to selectively synchronize or combine two or more travel diaries 150.

With reference now to FIG. 2C, an example GUI 224 is shown displayed on a client computing device 102 embodied as a mobile phone that includes a display of a selected travel diary 150a. According to an aspect, the travel diary 150a is displayed in a format that is optimized for small form factor devices, such as a mobile phone. The travel diary 150a can include one or more narrative portions 226 comprised of sentences and paragraphs generated by the sentence generation engine 126 and ordered by the sentence ordering engine 128. As described above, the sentences can include information extracted from or based on collected and received signals 108, explicit user input 110, as well as additional information obtained from one or more data sources 140. The travel diary 150a can further include a map 228 which can be automatically obtained via a map API or uploaded by the user. The travel diary 150a can further include one or more pieces of visual content 119 automatically selected by the trip content generation system 120 or selected or captured by the user. As should be appreciated, other types of content for inclusion in a travel diary 150 are possible and are within the scope of the present disclosure.

Figure 3A:
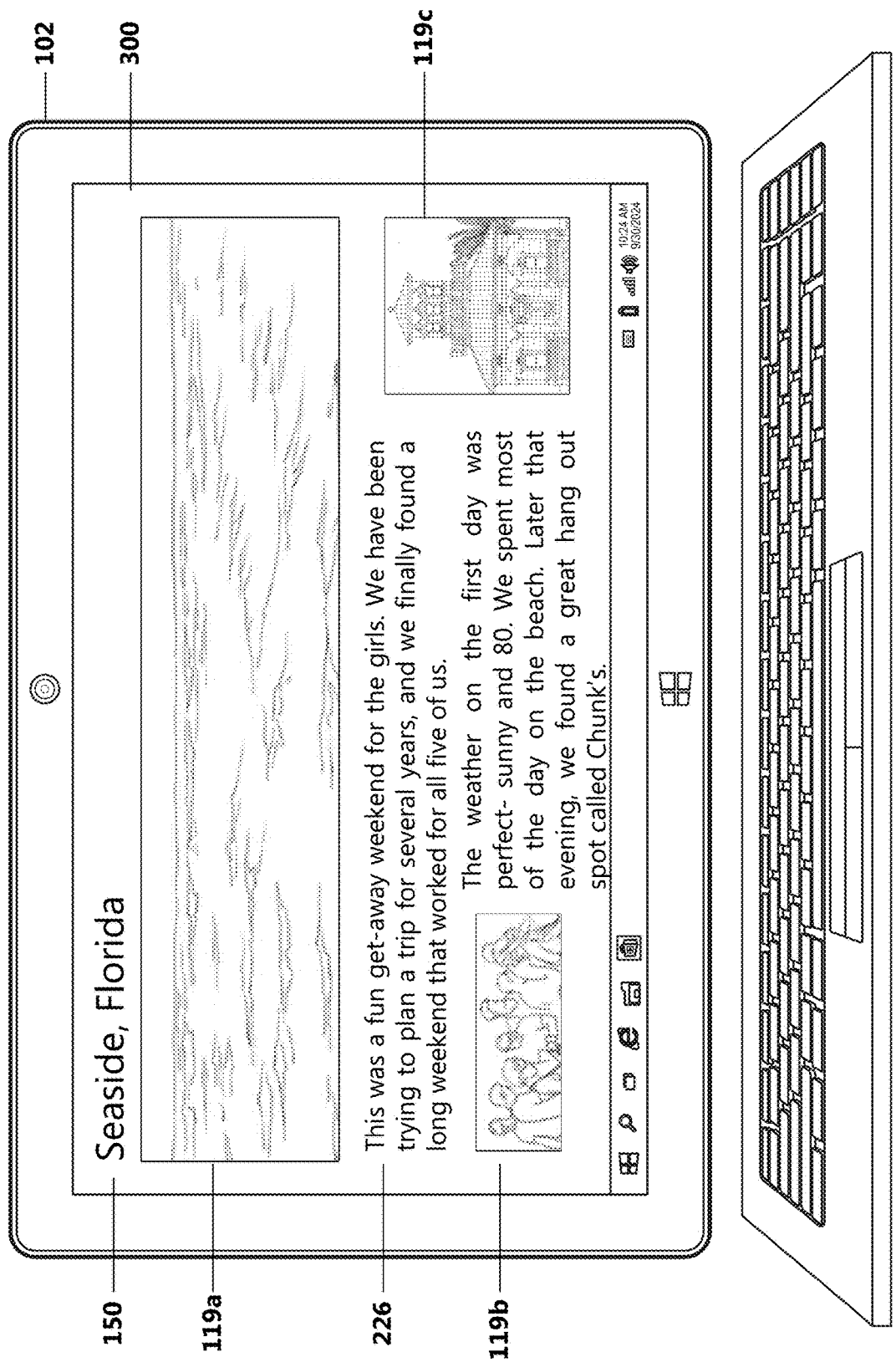

With reference now to FIG. 3A, an example GUI 300 is shown displayed on a client computing device 102 embodied as a laptop computing device that includes a display of a travel diary 150. According to an aspect, the travel diary 150 is displayed in a format that is optimized for the screen space provided by the laptop computing device. As described above, the travel diary 150 can include one or more visual content items 119a-n, a narrative portion 226 comprised of sentences and paragraphs generated by the trip content generation system 120, and other content associated with travel-information information gleaned from collected and received signals 108 and data obtained from one or more data sources 140.

With reference now to FIG. 3B, the example GUI 300 includes a display of the travel diary 150 scrolled to the end of the diary. According to an aspect and as illustrated, an edit functionality 302 can be provided, which when selected enables the user to edit travel diary content (e.g., narrative portion 226, visual content 119, other content) inline in the travel diary 150.

Figure 3C:
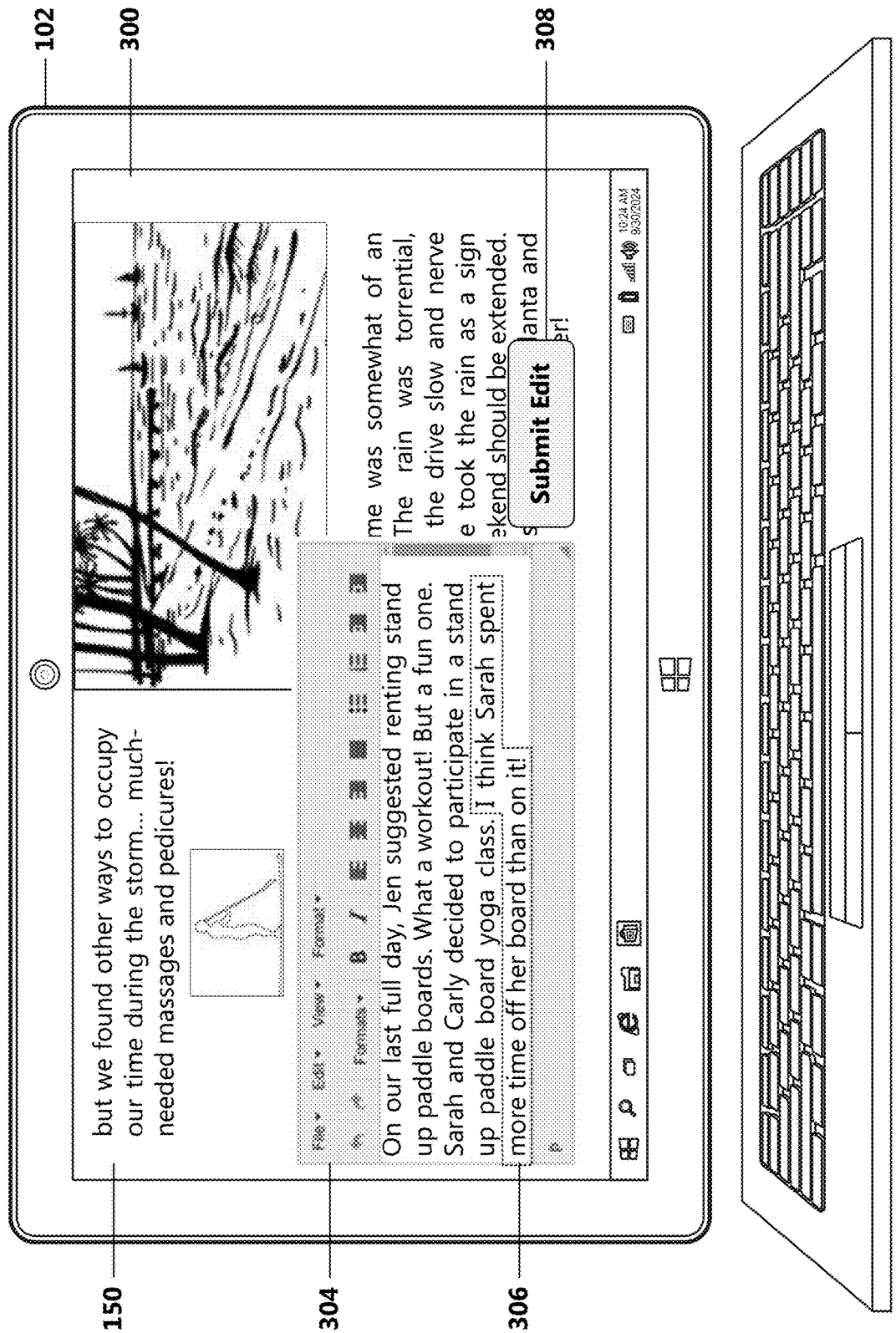

With reference now to FIG. 3C, the example GUI 300 includes a text edit interface 304 for enabling the user to edit a narrative portion 226 of the travel diary content. For example, the user selectively adds a sentence 306 to the narrative portion 226. Selection of a submit edit functionality 308 can upload the user input 110 to the trip content generation system 120 and save the edits/feedback to the travel diary 150. In some examples, the user can correct content of the narrative portion 226, reorder content, or remove or add photos, videos, or other visual content 119. The user feedback (i.e., user corrections) can be used by the trip content generation system 120 to train or tune the sentence generation engine 126 and sentence ordering engine 128.

Figure 4:
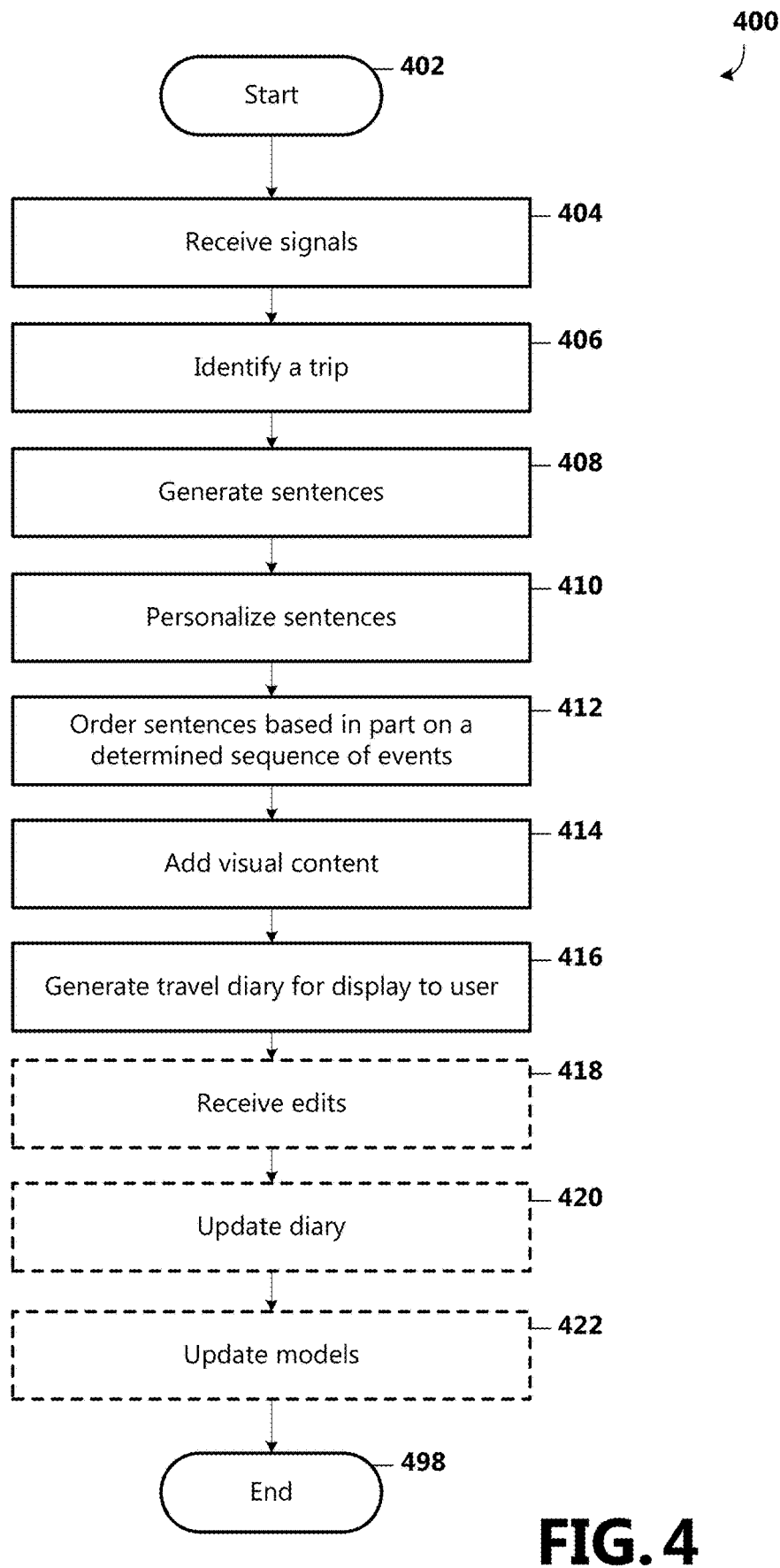
FIG. 4 is a flowchart showing general stages involved in an example method for automatically generating a travel diary.

FIG. 4 is a flow chart showing general stages involved in an example method 400 for automatically generating a travel diary 150. With reference now to FIG. 4, the method 400 begins at START OPERATION 402, and proceeds to OPERATION 404, where various implicit and explicit signals 108 from a plurality of signal sources 105 are collected or received.

The method 400 proceeds to OPERATION 406, where a trip (comprised of one or more visits and is associated with a start date and an end date) is identified based on the collected or received signals 108. For example, location signals 112 can be used to identify visits made by a user, such as visits to a particular location or a particular point of interest (POI), the user's browsing history (i.e., browse or search signals 114) can be used to identify locations that the user has visited, POIs searched for by the user, etc., the user's calendar events can be used to identify user activities, the user's communications 116 can be used to identify information such as flight, hotel, car, train, or other bookings, the user's documents 118 and visual content items 119, such as photos or videos can be used to identify visits made during the trip, etc. In some examples, a trip type (e.g., recreational, work-related, social) is identified.

The method 400 continues to OPERATION 408, where sentences are generated based on data associated with received and collected signals 108 and other data provided by one or more data sources 140. At OPERATION 410, the generated sentences are personalized to the user. For example, the sentence generation engine 126 restructures the sentences using detected user writing patterns (e.g., learned from various collected and received signals 108) to mimic the user's vocabulary and writing style.

The method 400 proceeds to OPERATION 412, where the sentences are ordered based at least in part on a determined sequence of events (e.g., based on timestamps). The sentences can be ordered based on additional aspects, such as learned chronological ordering methods. At OPERATION 414, images and videos 119 are combined with the narrative portion 226 using location signals 112, the chronological order of images and content, and determined relatedness of sentences and images and videos.

The method 400 continues to OPERATION 416, where a travel diary 150 is generated for display to the user. As described above, the travel diary 150 can be presented differently based on the client computing device 102 on which it is viewed.

At OPTIONAL OPERATION 418, the user makes edits to the travel diary 150. For example, the user can modify trip dates, add or edit a trip/diary name, synchronize or combine identified trips, add visual content 119, edit text, remove text or visual content, or rearrange content.

At OPTIONAL OPERATION 420, the travel diary 150 is updated based on the user input 110, and one or more models used by the trip content generation system 120 are retrained or tuned based on the user input at OPTION OPERATION 422. The method 400 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
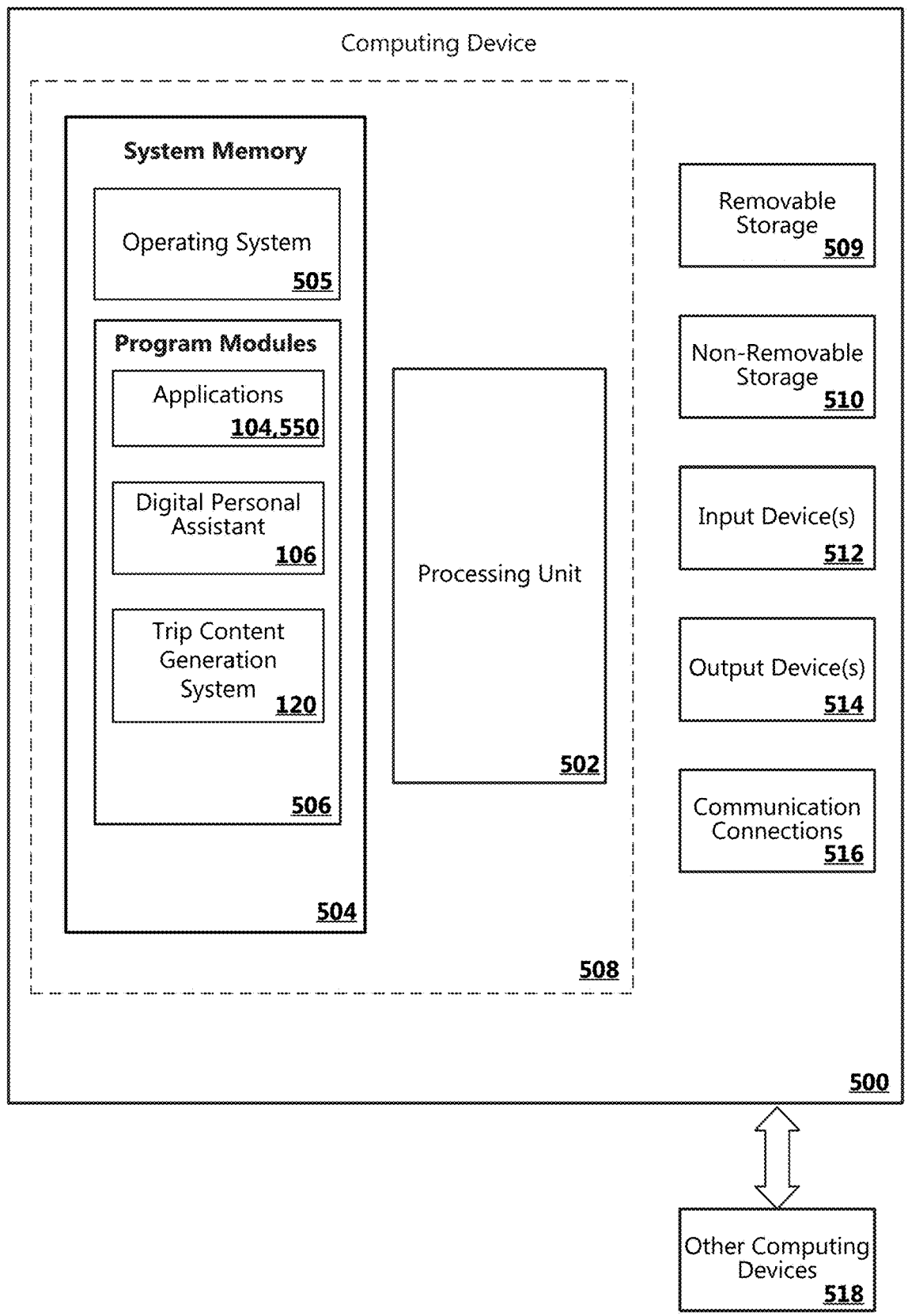
FIG. 5 is a block diagram illustrating physical components of a computing device with which examples may be practiced.
Figure 6A:
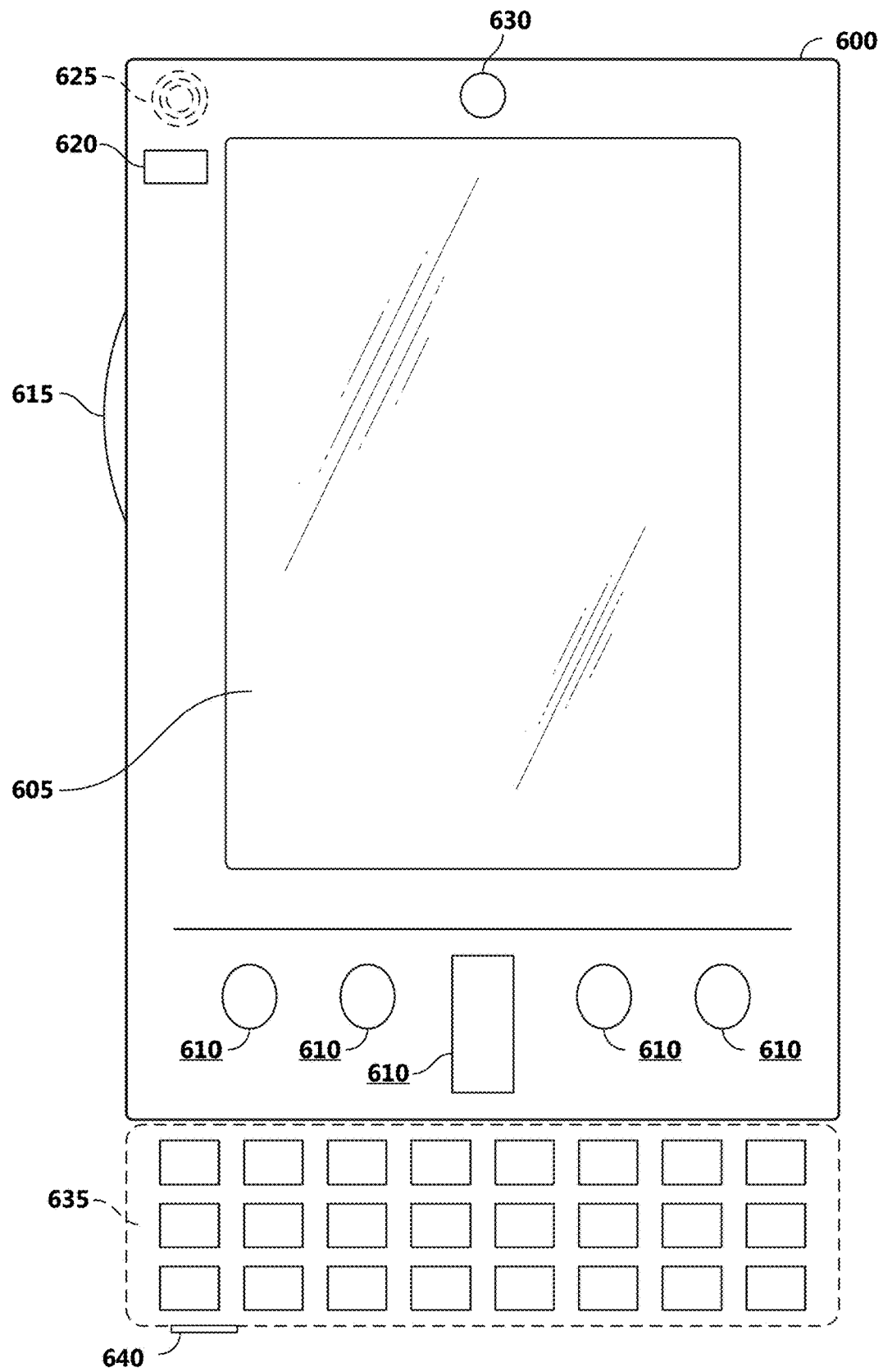
FIGS. 6A and 6B are block diagrams of a mobile computing device with which aspects may be practiced.
Figure 6B:
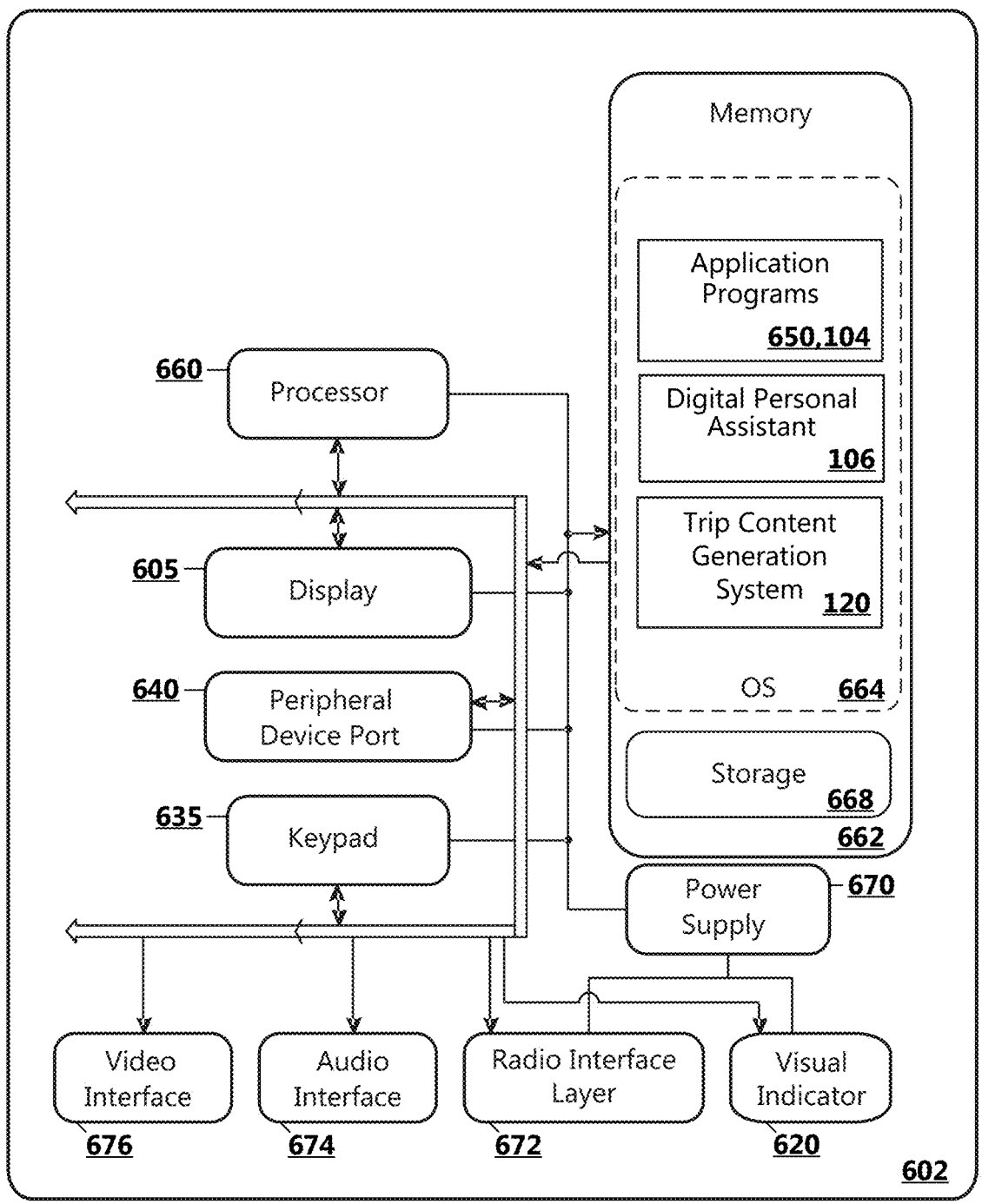
Figure 7:
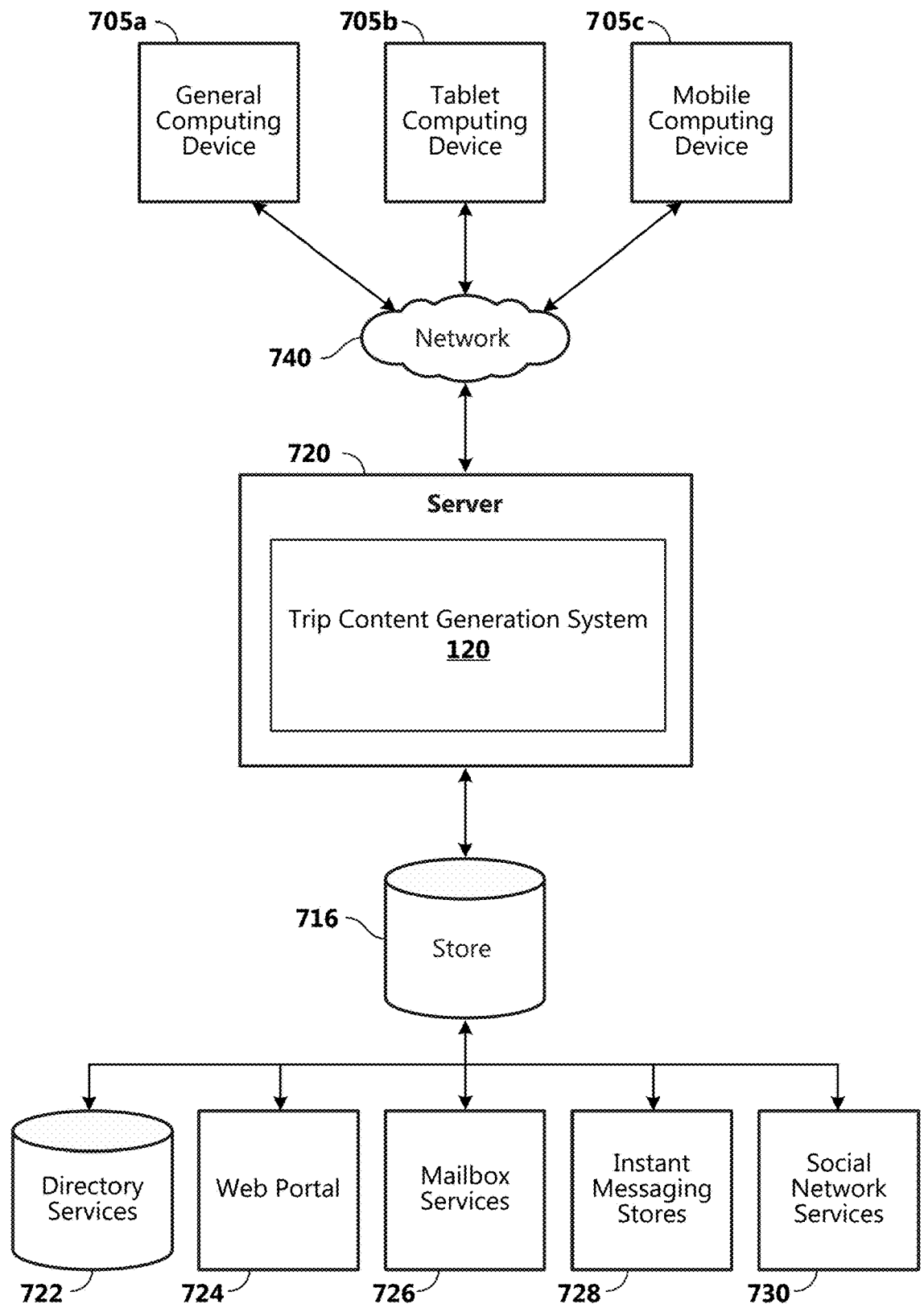
FIG. 7 is a block diagram of a distributed computing system in which aspects may be practiced.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure are be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550,104. According to an aspect, the system memory 504 includes a digital personal assistant 106. According to another aspect, the system memory 504 includes one or more components of the trip content generation system 120. The operating system 505, for example, is suitable for controlling the operation of the computing device 500.

Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., one or more components of the trip content generation system 120) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided drafting application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the digital personal assistant 106 is loaded into memory 662. According to another aspect, one or more components of the trip content generation system 120 are loaded into memory 662. The system 602 also includes a non-volatile storage area 668 within the memory 662. The non-volatile storage area 668 is used to store persistent information that should not be lost if the system 602 is powered down. The application programs 650,104 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for automatically generating a travel diary 150, as described above. Content developed, interacted with, or edited in association with one or more components of the trip content generation system 120 is enabled to be stored in different communication channels or other storage types. For example, various documents may be stored using a directory service 722, a web portal 724, a mailbox service 726, an instant messaging store 728, or a social networking site 730. One or more components of the trip content generation system 120 are operative to use any of these types of systems or the like for automatically generating a travel diary 150, as described herein. According to an aspect, a server 720 provides one or more components of the trip content generation system 120 to clients 705a,b,c. As one example, the server 720 is a web server providing one or more components of the trip content generation system 120 over the web. The server 720 provides one or more components of the trip content generation system 120 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for automatically generating a travel diary, comprising:
 a processing unit; and
 a memory, including computer readable instructions, which when executed by the processing unit is configured to provide a trip content generation system configured to:
  collect signals from at least one signal source;
  identify, from the signals, a trip made by a user;
  collect information associated with the identified trip;
  generate sentences based on the collected signals;
  personalize the sentences based on a learned writing style associated with the user;
  order the personalized sentences based at least in part on a determined sequence of trip-related events;
  supplement the personalized ordered sentences with visual content; and
  generate a travel diary comprising the personalized ordered sentences and visual content for display to the user.

2. The system of claim 1, wherein the signals include various signals selected from a group comprised of:
 user inputs;
 location signals;
 browser and search signals;
 e-commerce activity signals;
 user communications;
 user documents;
 visual content;
 calendar events; and
 social media signals.

3. The system of claim 1, wherein the at least one signal source comprises one or more of:
 an application;
 a digital personal assistant; and
 sensors.

4. The system of claim 1, wherein in collecting information associated with the identified trip, the system is further configured to collect at least one of:
 explicit user input;
 knowledge graph data;
 web index data;
 map data;
 user profile data; and
 user preference data.

5. The system of claim 4, wherein in collecting information associated with the identified trip, the system is further configured to collect information associated with entities, places, or points of interest identified in the collected signals.

6. The system of claim 5, wherein in generating sentences, the system is further configured to:
query a knowledge graph via at least one of:
a weather API for weather-related information;
a map API for map-related data; and
a web search API for popularly used sentences describing one or more of the entities, places, or points of interest identified in the collected signals; and
enrich the sentences based on results from querying the knowledge graph.

7. The system of claim 1, wherein in personalizing the sentences, the system is operative or configured to:
learn a writing style based on analysis of communications associated with the user; and
restructure the sentences based on the learned writing style.

8. The system of claim 1, wherein in ordering the personalized sentences, the system is further configured to order the personalized sentences based at least in part on topical segmentation and chronological ordering of sentences.

9. The system of claim 1, wherein in collecting signals, the system is further configured to receive user input via a network connection with a client computing device, wherein the user input is previously obtained by a signal source associated with the client computing device while the client computing device is operating in an offline mode.

10. The system of claim 1, wherein the system is further configured to: receive user feedback subsequent to generating the travel diary for display to the user;
update the travel diary based on the user feedback; and
use the user feedback to retrain one or more models used by the system to perform at least one of:
identification of a trip;
generation of sentences;
personalization of sentences; and
ordering of sentences.

11. A method for automatically generating a travel diary, comprising:
collecting signals from at least one signal source including a personal digital assistant;
identifying, from the signals, a trip made by a user;
collecting information associated with entities, places, or points of interest identified in the collected signals, wherein the collected information includes user profile data;
generating sentences based on the collected information;
personalizing the sentences based on a learned writing style associated with the user;
ordering the personalized sentences based at least in part on a determined sequence of trip-related events;
supplementing the personalized ordered sentences with visual content; and
generating a travel diary comprising the personalized ordered sentences and visual content for display to the user.

12. The method of claim 11, wherein collecting signals comprises:
collecting signals from at least one of:
an application;
and
a sensor; and
collecting signals selected from a group comprised of:
user inputs;
location signals;
browser and search signals;
e-commerce activity signals;
user communications;
user documents;
visual content;
calendar events; and
social media signals.

13. The method of claim 11, wherein collecting information associated with entities, places, or points of interest identified in the collected signals comprises collecting at least one of:
explicit user input;
knowledge graph data;
web index data;
map data;
and
user preference data.

14. The method of claim 11, wherein personalizing the sentences comprises:
learning a writing style based on an analysis of communications made by the user; and
restructuring the sentences based on the learned writing style.

15. The method of claim 14, wherein:
learning the writing style comprises learning a plurality of writing styles used by the user in the user's communications and documents;
identifying the trip made by the user comprises identifying a trip type; and
restructuring the sentences comprises:
associating the identified trip with a learned writing style based on the identified trip type; and
restructuring the sentences based on the writing style associated with the identified trip type.

16. The method of claim 11, wherein ordering the personalized sentences comprises ordering the personalized sentences based at least in part on topical segmentation and chronological ordering of sentences.

17. The method of claim 11, wherein collecting signals comprises receiving user input via a network connection with a client computing device, wherein the user input is previously obtained by a signal source associated with the client computing device while the client computing device is operating in an offline mode.

18. The method of claim 11, further comprising:
receiving user feedback subsequent to generating the travel diary for display to the user;
updating the travel diary based on the user feedback; and
using the user feedback to tune one or more models to perform at least one of:
identification of a trip;
generation of sentences;
personalization of sentences; and
ordering of sentences.

19. A computer readable storage device including computer readable instructions, which when executed by a processing unit is operable to:
collect signals from at least one signal source;
identify, from the signals, a trip made by a user;
collect information associated with entities, places, or points of interest identified in the collected signals;
generate sentences based on the collected signals;
personalize the sentences based on a learned writing style associated with the user;

order the personalized sentences based at least in part on a determined sequence of trip-related events;
supplement the personalized ordered sentences with visual content; and
generate a travel diary comprising the personalized ordered sentences and visual content for display to the user;
receive user feedback subsequent to generating the travel diary for display to the user;
update the travel diary based on the user feedback; and
use the user feedback to retrain a model used by the system to perform at least one of:
identification of a trip;
generation of sentences;
personalization of sentences; and
ordering of sentences.

20. The computer readable storage device of claim 19, wherein personalizing the sentences based on the learned writing style associated with the user comprises:
learning a plurality of writing styles used by the user in communications and documents made by the user;
identifying, from the signals, a trip type;
associating the identified trip with a learned writing style based on the identified trip type; and
restructuring the sentences based on the writing style associated with the identified trip type.

* * * * *